March 11, 1924.
R. MAES
MILKING MACHINE
Filed June 23, 1921
1,486,671
7 Sheets-Sheet 1
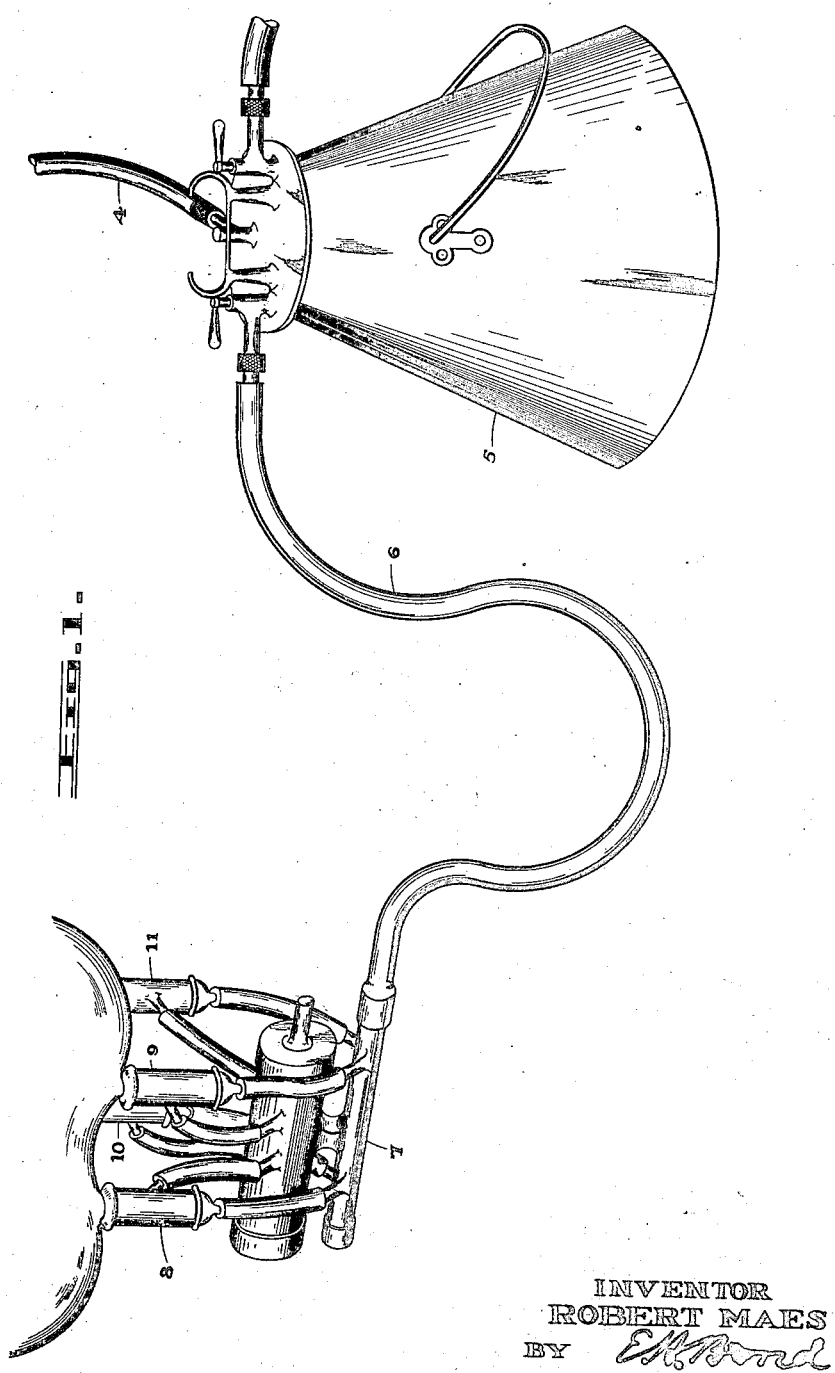
INVENTOR
ROBERT MAES
BY
ATTORNEY

March 11, 1924.
R. MAES
1,486,671
MILKING MACHINE
Filed June 23, 1921     7 Sheets-Sheet 2
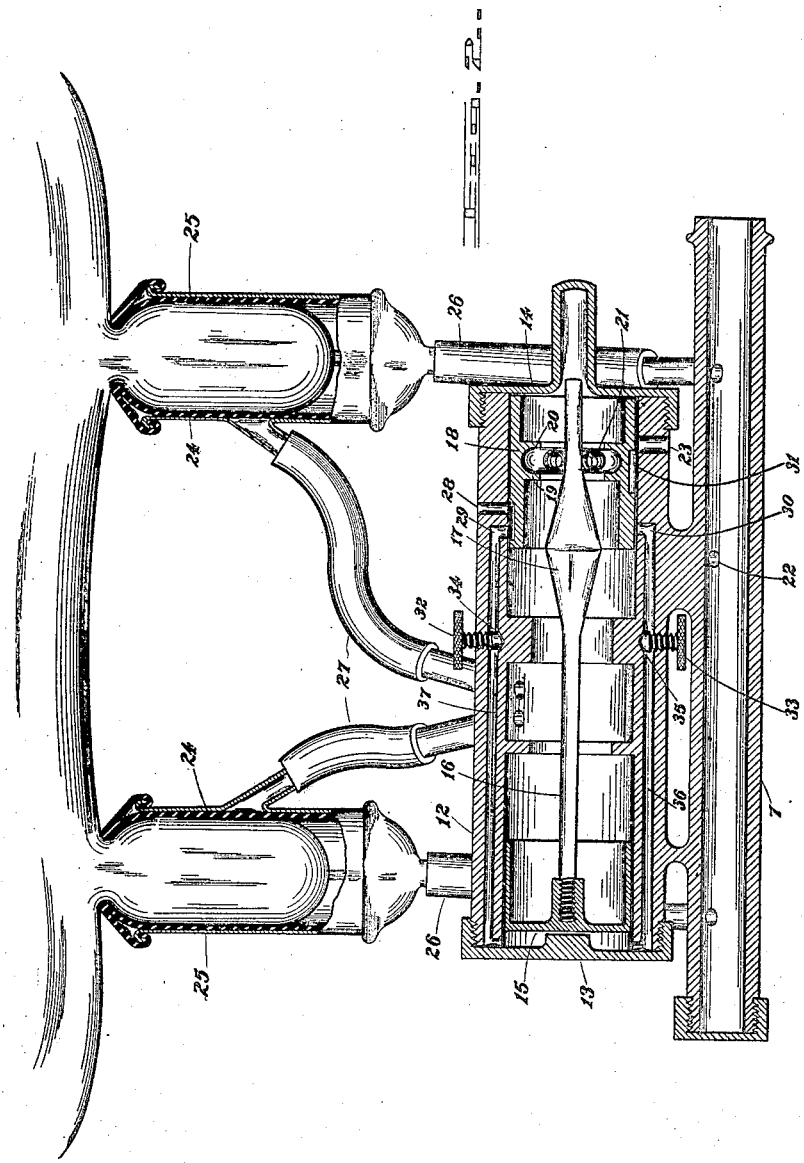
INVENTOR.
ROBERT MAES.
BY
ATTORNEY.

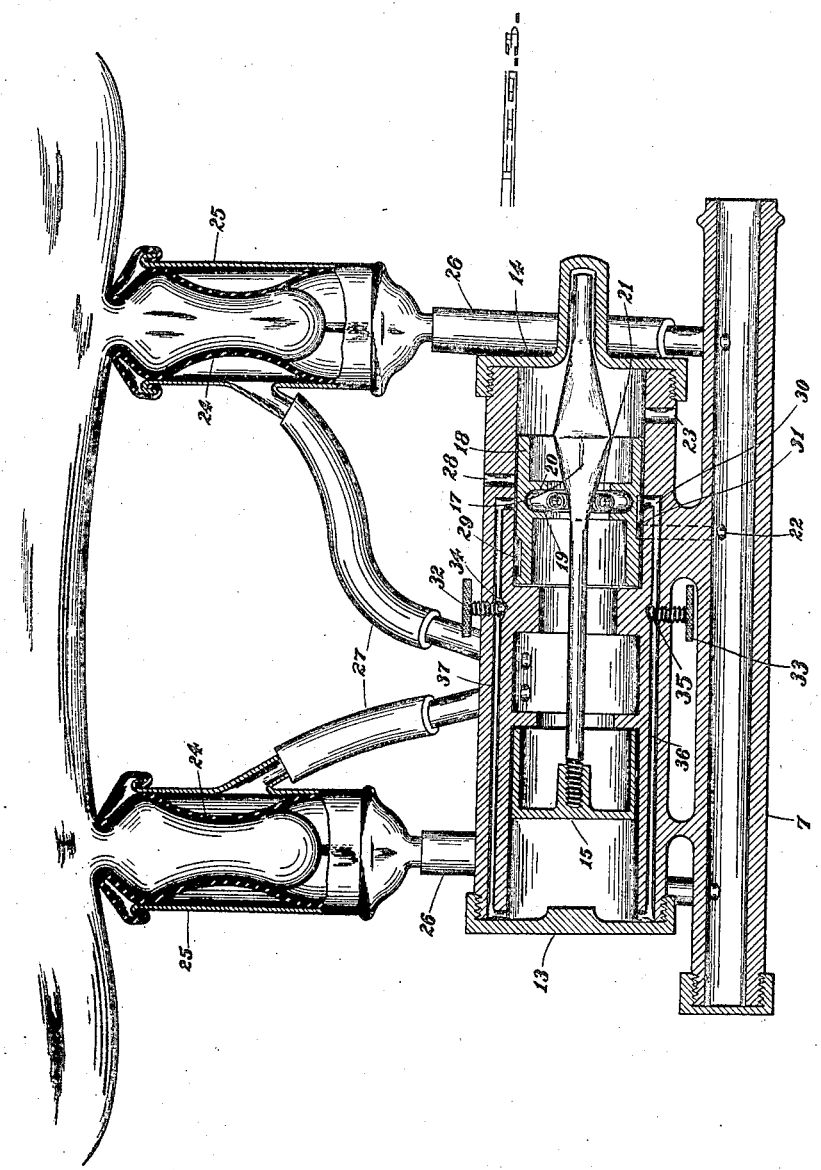

March 11, 1924.
R. MAES
1,486,671
MILKING MACHINE
Filed June 23, 1921
7 Sheets-Sheet 4
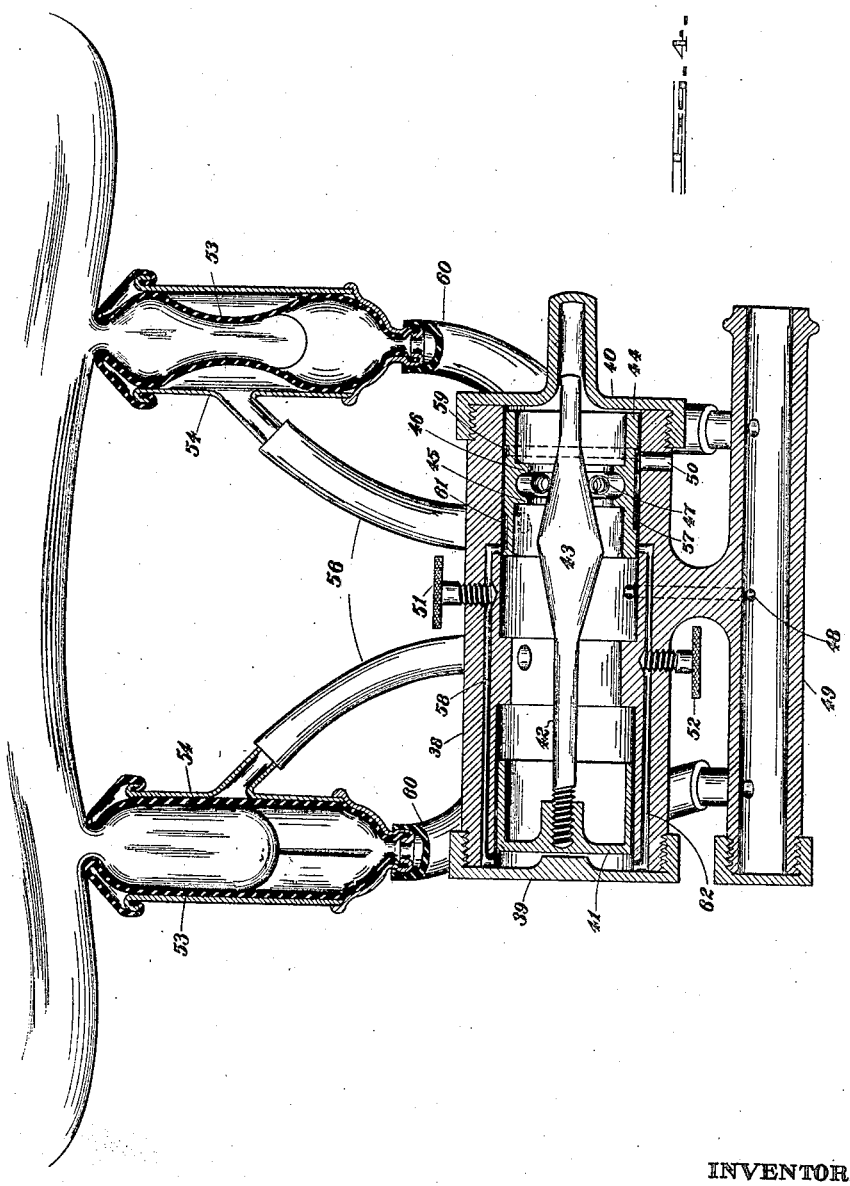
INVENTOR.
ROBERT MAES.
BY
ATTORNEY.

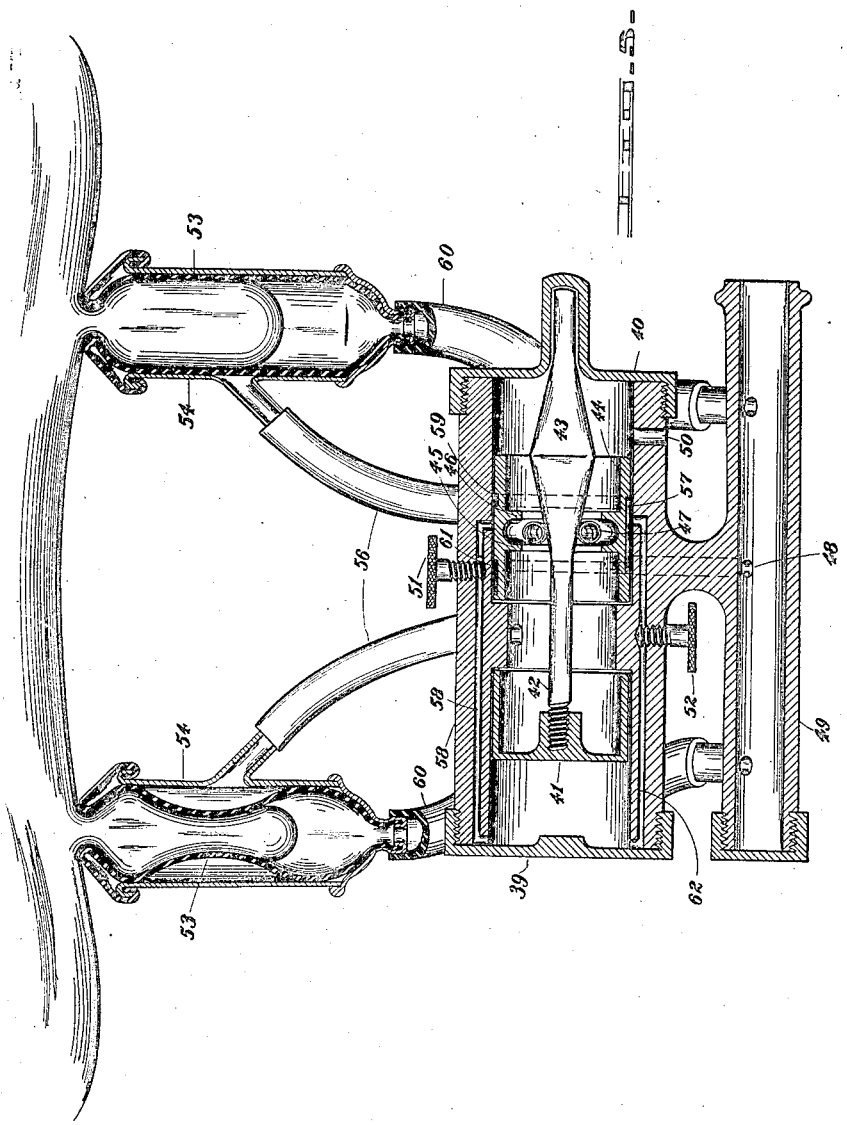

March 11, 1924. 1,486,671
R. MAES
MILKING MACHINE
Filed June 23, 1921 7 Sheets-Sheet 6
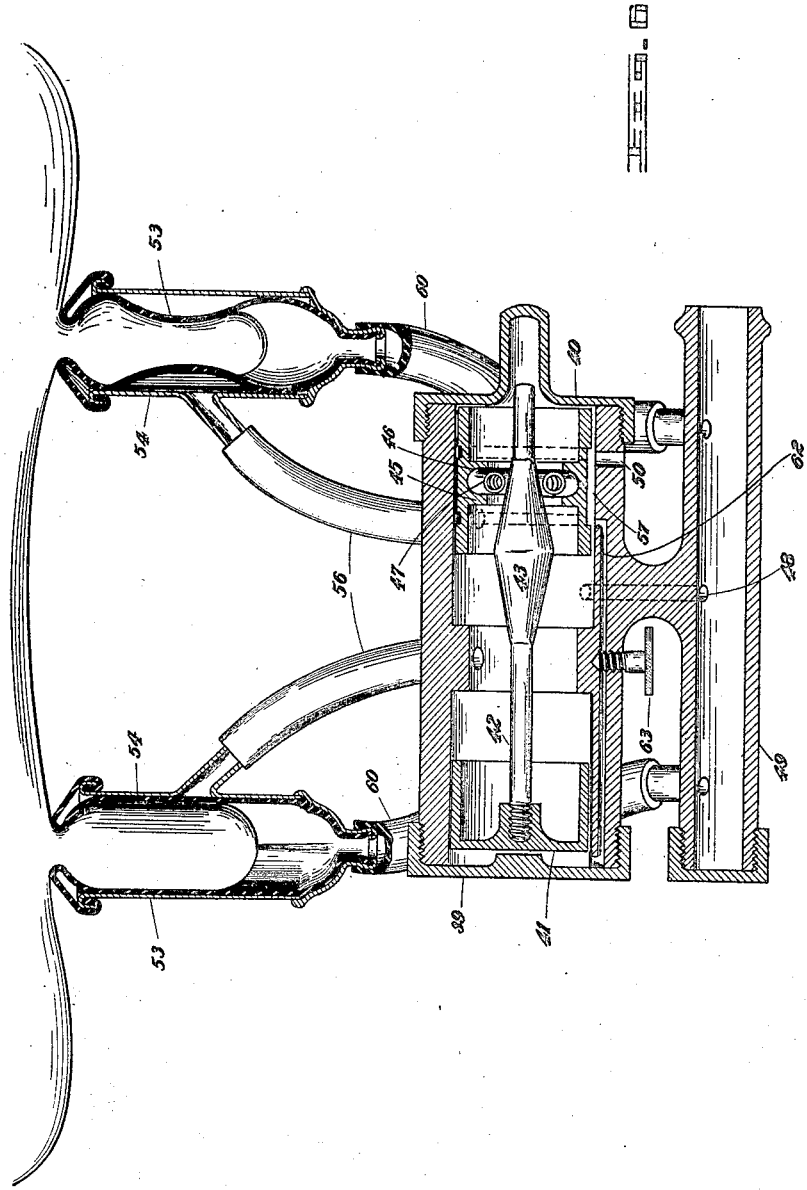
INVENTOR.
ROBERT MAES.
BY
ATTORNEY.

March 11, 1924.
R. MAES
MILKING MACHINE
Filed June 23, 1921
1,486,671
7 Sheets-Sheet 7
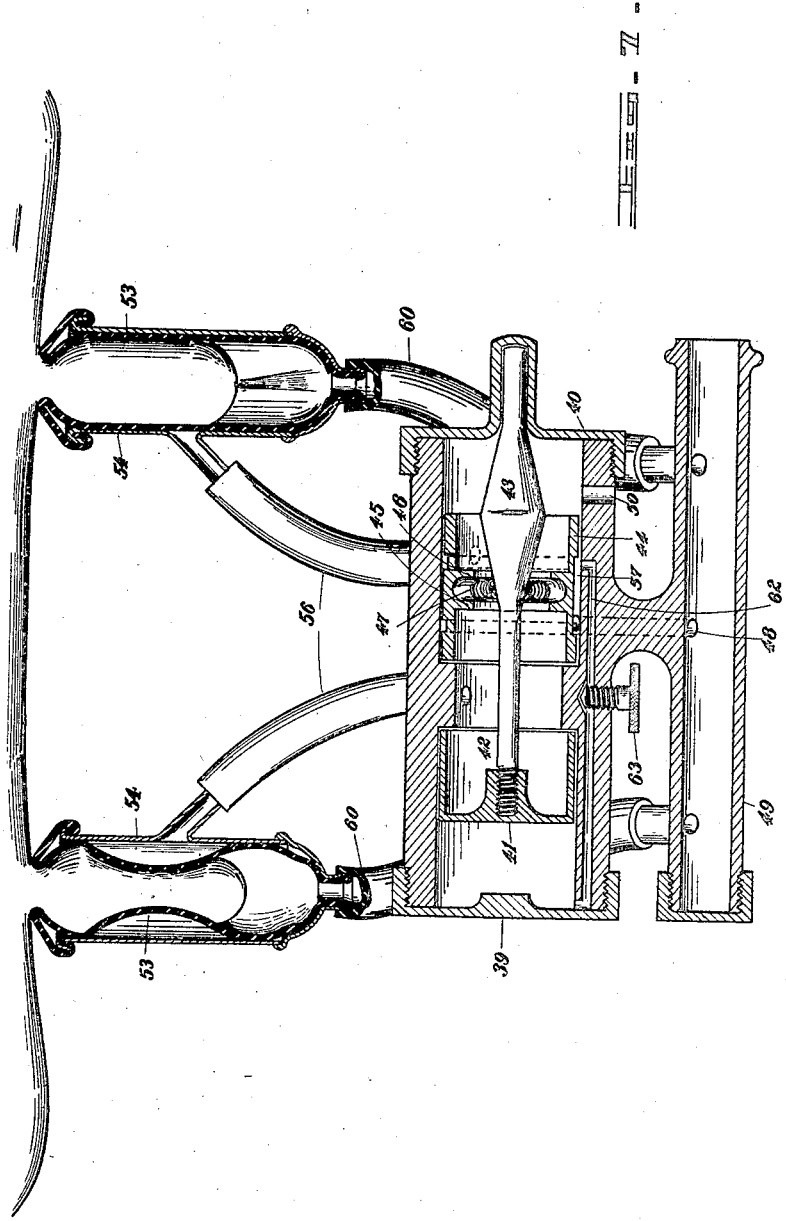
INVENTOR.
ROBERT MAES.
BY *E.H.Bond*
ATTORNEY.

Patented Mar. 11, 1924.

1,486,671

UNITED STATES PATENT OFFICE.

ROBERT MAES, OF CALGARY, ALBERTA, CANADA.

MILKING MACHINE.

Application filed June 23, 1921. Serial No. 479,841.

*To all whom it may concern:*

Be it known that I, ROBERT MAES, a citizen of the Dominion of Canada, residing at Calgary, in the county of Calgary and Province of Alberta, have invented certain new and useful Improvements in Milking Machines, of which the following is a specification.

The present invention relates to improvements in milking machines and more particularly refers to the pulsator. The principal object of the invention is to provide a device of the character described, functioned to impart pulsative strokes which draw and massage the teats of a cow simultaneously and alternately.

A modified form of the invention is also provided, in which the front teats of the cow are drawn and the rear teats massaged simultaneously and alternately, thus extracting the lactic fluid in as nearly a natural manner as possible. I accomplish this in the device illustrated in the accompanying drawings, in which Figure 1 is a detailed fragmentary perspective view illustrating the embodiment of my present invention.

Figure 2 is a vertical, longitudinal section through the extracting elements of the preferred form of the device, illustrating the lactic fluid flowing from the teats.

Figure 3 is a similar view illustrating the intermittent action.

Figure 4 is a vertical longitudinal section through the extracting elements of a modified form of the device, illustrating the lactic fluid flowing from one teat while the other is being massaged.

Figure 5 is a similar view illustrating the intermittent action.

Figure 6 is a vertical longitudinal section through the extracting elements of a still further modified form of the device, illustrating the lactic fluid flowing from one teat while the other is being massaged.

Figure 7 is a similar view illustrating the intermittent action.

Referring to the drawings, like numerals designate like parts in the various drawings.

In this device, the vacuum is created in a generative tank by means of an ordinary vacuum pump, which may be driven by any suitable form of motive power. From this tank, vacuum is conducted by means of a pipe to the cow stable or milk house where the milking is to be done.

The vacuum pipe is preferably located along the cow stanchions and intermediate each pair of cows is inserted a tap where the operator can connect his milking unit so as to lead down the vacuum to the milk pail and the teatcups where the milking takes place.

The milking is caused by the action of the permanent vacuum brought to the inner chamber of the cups and by alternate strokes of atmospheric pressure and suctions of vacuum on the vacuum chamber where the cow's teats are drawn and held by the permanent vacuum.

Figure 1 illustrates the milking unit as the portable part of the device and which the operator moves from cow to cow to perform the milking operation.

The unit consists of the flexible tube 4 which is connected to the aforementioned vacuum pipe which is not illustrated and leads down the vacuum to the pail or receptacle 5 and from there through tube 6 to the teatcup claw 7, thence to teatcups 8, 9, 10 and 11.

The pulsator, which is the most important part of the machine, is further illustrated in Figures 2, 3, 4, 5, 6 and 7.

The pulsator is an exclusive feature of this invention and its simple construction and action are hereinafter described.

Referring to Figures 2 and 3 illustrating the preferred form of the pulsator, the numeral 12 indicates the cylindrical chamber having caps 13 and 14 demountably positioned on each terminal. These caps enable the operator to quickly dismantle the pulsator at any necessary time.

Centrally positioned in the cylindrical chamber 12, is a piston 15, detachably mounted on the piston rod 16. A cam, indicated by the numeral 17, is co-frusto-conically configurated on the piston rod 16 and functioned to operate the sliding sleeve 18. This sliding sleeve is configurated to comply with the contour of the cylindrical chamber 12 and is snugly fitted therein. Flanges 19 and 20 are configurated on its inner periphery. The numeral 21 indicates an annular coil spring which is positioned intermediate the flanges 19 and 20 and is adapted to roll over the face of the cam 17 when the same reciprocates through the sliding sleeve 18, carrying the said sleeve with it. Port 22 is positioned in the lower extremity of the cylindrical chamber 12 connecting its interior with the permanent vacuum in the teatcup claw 7. Port 23 opens to the atmosphere. The annular coil spring 21 brings about the alternate action on the cow's teats by the snappy reciprocation of the sliding sleeve 18. The teatcups consist of a flexible chamber 24 surrounded by a rigid outer casing 25. The interior of the flexible chamber receives one of the cow's teats and is connected through the base of the teatcup by a flexible connection indicated by the numeral 26 to the teatcup claw 7. The chamber intermediate the flexible chamber and the rigid outer casing 25 is connected by a flexible connection 27 from its side to the cylindrical chamber 12.

Referring to Figure 2, the piston 15 is at the terminal of the cylindrical chamber 12, and ready for the inward stroke. The sliding sleeve 18 is at the opposite terminal of the cylindrical chamber 12. In this position, port 22 is opened, connecting the interior of the cylindrical chamber 12 with the permanent vacuum in the teatcup claw 7, thus creating vacuum in the cylindrical chamber 12 and in the chamber intermediate the flexible chamber and the rigid outer casing of the teatcup through the flexible connection 22.

In this position, the atmosphere in the pulsator and in the chamber intermediate the flexible chamber and the rigid outer casing of the teatcup is drawn away through port 22, thus enabling the permanent vacuum of the inner chamber to extract the milk from the teats. Simultaneously, the atmosphere is allowed back of piston 15 through port 28 by means of the longitudinal groove 29 configurated in the sliding sleeve 18, thus enabling the vacuum on the inner side of the piston to gradually draw inwardly on the same.

By this action, cam 17 is forced to the sliding sleeve 18 until its top centre reaches the centre of the annular coil spring 21 positioned in the sliding sleeve. At this instant, the sliding sleeve 18 snaps into the position as indicated diagrammatically in Figure 3, thus closing port 28 and opening port 30, also closing the port 22 which communicates with the chamber 12 and opening port 23.

In this position, atmosphere rushes through the port 23 into the pulsator and the chamber intermediate the flexible chamber and the rigid outer casing of the teatcups, thus producing the squeeze on the cow's teats.

Port 30 is now in communication with the port 22 by means of the groove 31, which is configurated angularly in alignment in the sleeve 18. The atmosphere which is found at the rear of piston 15 is gradually being drawn away through the port 30 with the result that the piston 15 again begins to travel backwards because of the atmospheric pressure in its inner side. Then once more, the sliding sleeve 18 is instantly thrown back to its original position as indicated diagrammatically in Figure 2 and so the desired pulsating action is accomplished. Needle screws 32 and 33 regulate the size of the communication ports 34 and 35 positioned in the transverse openings 36 and 37, thus enabling the operator to regulate the speed with which the piston 15 shall reciprocate, the object of this being to exert a long or short massage and a long or short suction on the cow's teats.

Referring now to Figures 4 and 5 which illustrate a modified form of the invention functioned to impart pulsative strokes which draw the front and massage the hind teats of the cow simultaneously and alternately, the numeral 38 indicates the cylindrical chamber of the pulsator which has caps 39 and 40 detachably positioned on each terminal. It is obvious that these caps are functioned to enable the operator to quickly dismantle the pulsator as in the previously described form of pulsator. Centrally positioned in the cylindrical chamber 38 is piston 41 which is detachably mounted on the piston rod 42. Cam 43 is co-frusto-conically configurated on the piston rod 42 and functioned to operate the sliding sleeve indicated by the numeral 44 and which has flanges 45 and 46 configurated on its inner periphery. An annular coil spring indicated by the numeral 47 is disposed intermediate the flanges 45 and 46 and rolls over the face of the cam 43 when the same reciprocates through the sliding sleeve 44.

Port 48 is positioned in the lower portion of the cylindrical chamber 38 connecting its interior with the permanent vacuum in the teatcup claw 49. Port 50 opens to the atmosphere. The annular coil spring 47 brings about the alternate action on the teats by the snappy reciprocation of the sliding sleeve 44. For controlling the speed of the piston 41, I provide needle screws 51 and 52.

The teatcups, in conjunction with this pulsator, will be of the same construction as in the aforementioned form and consist of a central flexible chamber indicated by the numeral 53 and surrounded by an outer rigid casing indicated by the numeral 54. The interior of the flexible chamber 53 receives the teats of the cow and is connected through the base of the teatcup by a flexible connection 60 to the teatcup claw 49. The outer rigid casing 54 is connected at its side by a flexible tube 56 to the cylindrical chamber 38.

Referring now to Figure 4, the piston 41 is at the terminal of the cylindrical chamber 38 and ready for the inward stroke. The sliding sleeve 44 is at the opposite terminal of the cylindrical chamber. In this position, port 48 is opened connecting the interior of the cylindrical chamber 38 with the permanent vacuum in the teatcup claw 49, thus creating vacuum in the cylindrical chamber 38 and in the chamber intermediate the outer rigid casing and the interior flexible chamber of the teatcup through the flexible connection 56. In this position, the front teat receives a massage as the atmosphere rushes through port 50 along the groove 57 and through the flexible connection 56 into the chamber intermediate the outer rigid casing and the interior flexible casing of the front teatcup. Atmosphere also rushes through the transverse opening 58 to the rear of the piston 41 resultant that the piston 41 gradually moves inward and forces the cam 43 through the annular coil spring 47 positioned in the sliding sleeve 44 until its top centre reaches the centre of the annular coil spring. At this point, sliding sleeve 44 is thrown into the position indicated diagrammetically in Figure 5. The reverse action as above described now takes place as atmosphere rushes in the cylindrical chamber 38 through the port 50 to the chamber intermediate the outer rigid casing and the flexible inner chamber of the hind teatcup, thus massaging the hind teat therein.

Port 48 connects with the chamber intermediate the outer rigid casing and the central flexible chamber of the front teatcup by way of groove 59 configurated in the slidable sleeve 44 and the flexible connection 56. Thus the front teat now receives a suction which extracts the lactic fluid and conducts the same through the flexible connection 60 to the teatcup claw 49. Port 48 also communicates with the rear of the piston through the transverse opening indicated by the numeral 62, thus drawing back the piston to its original position as illustrated in Figure 4.

Referring to Figures 6 and 7, the transverse opening 58 is dispensed with and the port indicated by the numeral 62 serves the double purpose of admitting atmosphere to the rear of the piston 41 for the inward stroke through the port 50 and groove 57 in the sliding sleeve 44 and of drawing the same atmosphere out again through the groove 57 and the port 48 for the outward stroke. The action of the pulsator illustrated in Figures 6 and 7 is otherwise similar to the action of the pulsator illustrated in Figures 4 and 5. Needle screw 63 is provided for controlling the speed of the piston.

While I have illustrated and described the preferred form of construction of my invention, this is capable of variation and modification without departing from the spirit of the invention. I, therefore, do not wish to be restricted to the precise details of construction specified, but desire to avail myself of such variations and modifications as come within the scope of the appended claims.

From the foregoing, it is thought that the construction of my invention will be clearly understood and therefore, a more extended explanation has been omitted.

What I claim as new is:

1. A milking machine, in combination with a teatcup and a vacuum extracting device, a pulsator, a teatcup claw disposed beneath the said pulsator chamber, a reciprocable piston rod disposed centrally in the said chamber and provided with a piston subject to atmospheric pressure, a cam configurated on the said piston rod in relation to a cylindrical sleeve slidable within the said chamber, an annular coil spring interiorly fitted to the said slidable sleeve and adapted to expand when the said cam engages it and to travel along the said cam as the result of contraction of the said annular coil spring, the said annular coil spring carrying the said slidable sleeve in the direction opposite to that of the said piston, a main port positioned to connect the said chamber with the said teatcup claw, a secondary port connecting the said chamber with the atmosphere, grooves configurated in the said slidable sleeve, upper and lower transverse grooves connecting the said upper and lower longitudinal openings positioned in the said chamber, the flexible inner chamber of the said teatcups connected to the said teatcup claw, the outer rigid casing of the rear teatcups connected to the said chamber, the outer rigid casing of the front teatcups connected with the said grooves configurated in the said slidable sleeve, the said sleeve slidable within the said chamber functioned to open and close ports imparting a draw or suction on the front teats disposed in the front teatcups and a massage on the rear teats disposed in the rear teatcups simultaneously and alternately.

2. A milking machine, in combination with a teatcup and a vacuum extracting device, a pulsator, a teatcup claw disposed beneath the said pulsator chamber, a reciprocable piston rod disposed centrally in the said chamber and provided with a piston subject to atmospheric pressure, a cam configurated on the said piston rod in relation to a cylindrical sleeve slidable within the said chamber, an annular coil spring interiorly fitted to the said slidable sleeve and adapted to expand when the said cam engages it and to travel along the said cam as the result of contraction of the said annular coil spring, the said annular coil spring carrying the said slidable sleeve in the direction opposite to that of the said piston, a main port positioned to connect the said chamber with the said teatcup claw, a secondary port connecting the said chamber with the atmosphere, grooves configurated in the said slidable sleeve, upper and lower transverse grooves connecting the said grooves, upper and lower longitudinal openings positioned in the said chamber, the flexible inner chamber of the said teatcups connected to the said teatcup claw, the outer rigid casing of the rear teatcups connected to the said chamber, the outer rigid casing of the front teatcups connected with the said grooves configurated in the said slidable sleeve, the said slidable sleeve adapted to close the main and open the secondary ports resultant that the front teat receives a suction and the rear teat a massage, and to open the main port and close the secondary port resultant that the front teat receives a massage and the rear teat a suction, the said actions being simultaneous and alternate.

3. A milking machine, in combination with a teatcup and a vacuum extracting device, a pulsator, a teatcup claw disposed beneath the said pulsator chamber, a reciprocable piston rod disposed centrally in the said chamber and provided with a piston subject to atmospheric pressure, a cam configurated on the said piston rod in relation to a cylindrical sleeve slidable within the said chamber, an annular coil spring interiorly fitted to the said slidable sleeve and adapted to expand when the said cam engages it and to travel along the said cam as the result of contraction of the said annular coil spring, the said annular coil spring carrying the said slidable sleeve in the direction opposite to that of the said piston, a main port positioned to connect the said chamber with the said teatcup claw, a secondary port connecting the said chamber with the atmosphere, grooves configurated in the said slidable sleeve, upper and lower transverse grooves connecting the said grooves, upper and lower longitudinal openings positioned in the said chamber, the flexible inner chamber of the said teatcups connected to the said teatcup claw, the outer rigid casing of the rear teatcups connected to the said chamber, the outer rigid casing of the front teatcup connected with the said grooves configurated in the said slidable sleeve, the said slidable sleeve adapted to close the main and open the secondary ports resultant that the front teat receives a suction and the rear teat a massage, and to open the main port and close the secondary port resultant that the front teat receives a massage and the rear teat a suction, the said actions being simultaneous and alternate, and means for controlling the speed of the said pulsation strokes.

4. A milking machine, in combination with a teatcup and a vacuum extracting device, a pulsator, a teatcup claw disposed beneath the said pulsator chamber, a reciprocable piston rod disposed centrally in the said chamber and provided with a piston subject to atmospheric pressure, a cam configurated on the said piston rod in relation to a cylindrical sleeve slidable within the said chamber, an annular coil spring interiorly fitted to the said slidable sleeve and adapted to expand when the said cam engages it and to travel along the said cam as the result of contraction of the said annular coil spring, the said annular coil spring carrying the said slidable sleeve in the direction opposite to that of the said piston, a main port positioned to connect the said chamber with the said teatcup claw, a secondary port connecting the said chamber with the atmosphere, grooves configurated in the said slidable sleeve, a lower transverse groove connecting the said grooves, a lower longitudinal opening positioned in the said chamber, the flexible inner chamber of the said teatcups connected to the said teatcup claw, the outer rigid casing of the rear teatcups connected to the said chamber, the outer rigid casing of the front teatcups connected with the said grooves configurated in the said slidable sleeve, the said slidable sleeve within the said cylindrical chamber functioned to open and close ports imparting a draw or suction on the front teats disposed in the front teatcups and a massage on the rear teats disposed in the rear teatcups simultaneously and alternately.

5. A milking machine, in combination with a teatcup and a vacuum extracting device, a pulsator, a teatcup claw disposed beneath the said pulsator chamber, a reciprocable piston rod disposed centrally in the said chamber and provided with a piston subject to atmospheric pressure, a cam configurated on the said piston rod in relation to a cylindrical sleeve slidable within the said chamber, an annular coil spring interiorly fitted to the said slidable sleeve and adapted to expand when the said cam engages it and to travel along the said cam as the result of contraction of the said annular coil spring the said annular coil spring carrying the said slidable sleeve in the direction opposite to that of the said piston, a main port positioned to connect the said chamber with the said teatcup claw, a secondary port connecting the said chamber with the atmosphere, grooves configurated in the said slidable sleeve, a lower transverse groove connecting the said grooves, a lower longitudinal opening positioned in the said chamber, the flexible inner chamber of the said teatcups connected to the said teatcup claw, the outer rigid casing of the rear teatcups connected to the said cylindrical chamber, the outer rigid casing of the front teatcups connected with the said grooves configurated in the said slidable sleeve, the said slidable sleeve adapted to close the main and open the secondary ports resultant that the front teat receives a suction and the rear a massage, and to open the main port and close the secondary port resultant that the front teat receives a massage and the rear teat a suction, the said action being simultaneous and alternate and means controlling the speed of the said pulsation strokes.

In testimony whereof, I hereunto affix my signature in the presence of two witnesses.

ROBT. MAES.

Witnesses:
 E. S. CLARRY,
 CATHERINE H. MACGREGOR.